3,413,125
NON-ALCOHOLIC BEVERAGE
Harry R. Schuppner, Jr., El Cajon, Calif., assignor to Kelco Company, San Diego, Calif., a corporation of Delaware
No Drawing. Filed Oct. 22, 1964, Ser. No. 405,841
5 Claims. (Cl. 99—79)

ABSTRACT OF THE DISCLOSURE

An aqueous carbonated non-alcoholic diet-type beverage containing a beverage flavoring material, a beverage coloring material, an edible acid, artificial sweetener, water, and a Xanthomonas hydrophilic colloid.

---

This invention relates to improved non-alcoholic beverages and methods of preparing such beverages including the use of a Xanthomonas hydrophilic colloid. The invention is particularly suitable for preparing beverages of the dietetic carbonated type.

It is desirable that a non-alcoholic beverage have good mouth-feel characteristics. In such beverages, the presence of different concentrations of suspended and dissolved substances, such as sugars, will often significantly affect mouth-feel. Hence, the deletion of sugars in a dietetic type soft drink, where an artificial sweetener is used, leaves a great deal to be desired in the mouth-feel thereof.

In such beverages as carbonated drinks, otherwise known as carbonated non-alcoholic beverages, soft drinks, soda pop, tonic, and the like, additives therefor are subject to rather exacting specifications. An additive for such a beverage must be one that does not mask or alter flavor. Such drinks are often clear and bottled in a transparent container and hence an ideal additive should not give rise to haze, clouding, or visible matter or otherwise disturb the clarity of the drink.

Most beverages of the above described type, and especially soft drinks, are sold at relatively low prices. Thus, any additive used in them must necessarily be able to be supplied at reasonable cost and be usable conveniently without complicating or extending the preparation process.

An additive to a beverage must be readily and completely soluble therein and remain so under the acid environmental conditions thereof. Soft drinks are often highly acid especially in the concentrate syrup form in which they may be stored, the syrups being substantially more acid than the diluted drink when consumed. This problem of highly acidic concentrates is of concern in this art since bottlers and fountains customarily purchase syrup concentrates and store them for extended periods prior to mixing them in the finished drink. Hence, workers in the art will acknowledge that the stability of the concentrate is extremely important. The Xanthomonas hydrophilic colloid of the present invention provides an additive which is highly stable despite the customary acidity of such drink concentrates.

A related problem is the cold water solubility of bodying additives since it is customary to prepare beverage concentrates, and especially soft drink syrups by what is known as a "cold process," the concentrate ingredients being mixed at or about room temperature, no heat being supplied to facilitate the dissolving of the ingredients or the destruction of microorganisms. Thus, a beverage additive must be soluble in cold water for desirable versatility in use.

The beverage and liquid-food trade is becoming increasingly concerned with dietetic beverages. In such dietetic drinks, and more particularly those of the low calorie type, a dietetic sweetener such as calcium cyclamate at a concentration of about 0.20% by weight is customarily substituted for the usual soft drink syrup, including one or more of: a sugar, an invert sugar and dextrose at about 11% to 13% concentration by weight of the diluted drink. While providing a low calorie drink, such artificial sweeteners are devoid of the mouth-feel characteristics usually supplied by sugar.

It is an object of the present invention to provide a new and useful additive for non-alcoholic beverages particularly of the dietetic type.

It is a further object of the invention to provide an additive for a non-alcoholic beverage that will improve the mouth-feel thereof.

Still another object is to provide a method of improving the mouth-feel of a non-alcoholic beverage that will not impair the clarity thereof.

It is an additional object to provide an improved mouth-feel additive for dietetic soft drinks which is low in calories and substantially sodium free.

In accordance with my invention, I have found that one or more of the foregoing objectives may be accomplished by incorporating a relatively small amount of a Xanthomonas hydrophilic colloid in conventional soft drink formulations. Suitable amounts of such a colloid for my purposes are in the range of 0.01% to 0.25% by weight of the finished drink, while about 0.025% to .1% by weight of the said drink is preferred.

As an example of my invention, I incorporated about 0.05% by wet weight of a clarified type of hydrophilic colloid produced by the bacterium *Xanthomonas campestris* in a dietetic carbonated soft drink of the citric type. The drink so produced had an excellent mouth-feel although it contained only an artificial sweetner and no sugar. The clarity of the liquid was unchanged by the addition of a clarified type of the said Xanthomonas hydrophilic colloid. The flavor of the resulting drink was not impared by the addition of the Xanthomonas colloid.

In the aforementioned example of my invention employing a Xanthomonas hydrophilic colloid, I referred to a colloid produced by the bacterium *Xanthomonas campestris*. This colloidal material is a polymer containing mannose, glucose, potassium gluconate and acetyl radicals. In such a colloid, the potassium portion can be replaced by several other cations without substantial change in the property of the material for the instant purposes. This colloid, which is a high molecular weight, exocellular material, may be prepared from the bacterium *Xanthomonas campestris*, by whole culture fermentation of a medium containing 2% to 5% commercial glucose, organic nitrogen source, dipotassium hydrogen phosphate and appropriate trace elements. The incubation time is approximately 96 hours at 28° C., aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage, a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage, the reaction may be permitted to continue for 24 hours under the same conditions as the first stage. The culture so acclimated for use with glucose by the aforementioned first and second stages is then added to the final glucose medium. In the aforesaid method of preparing a *Xanthomonas campestris* hydrophilic colloid, a loopful of organism from the agar slant is adequate for the first stage comprising 200 milliliters of the said glucose media. In the second stage the material resulting from the first stage may be used together with nine times its volume of a 3% glucose media. In the final stage, the material produced in the second stage may be admixed with 19 times its volume of the final media. A good final media may contain 3% glucose, 0.5% distillers' dry solubles, 0.5% dipotassium phosphate, 0.1% magnesium sulphate having seven moles of water of crystallization and water. The reaction in the final stage may be satisfactorily carried out for 96 hours at 30° C. with vigorous agitation and aeration. The resulting *Xanthomonas campestris* colloidal material which I have found to be particularly suitable for my purpose can be recovered by precipitation in methanol of the clarified mixture from the fermentation. This resulting material may be further characterized as a hydrophilic colloid produced by the bacterium species *Xanthomonas campestris.*

Alternative Xanthomonas colloidal material was prepared by repeating the above prepartion procedure with certain other known Xanthomonas bacteria; namely with: *Xanthomonas incanae, Xanthomonas carotae, Xanthomonas begoniae, Xanthomonas phaseoli* and *Xanthomonas malvacearum.*

However, these alternative Xanthomonas hydrophilic colloid materials are not full equivalents, i.e., they must be substituted in different proportions from that of the *Xanthomonas campestris.* Accordingly, equivalent Xanthomonas colloids found satisfactory for substitution for the campestris variety in the examples to be described hereinafter are listed below in Table I. Listed also are the relative proportions generally substituted for one part *Xanthomonas campestris.*

TABLE I

| Xanthomonas colloid equivalents were derived from: | Substituent colloid quantity, parts |
|---|---|
| *Xanthomonas camprestris* | 1 |
| *Xanthomonas malvacearum* | 1.25 |
| *Xanthomonas carotae* | 1.25 |
| *Xanthomonas begoniae*: | |
| Strain 3 | 1.65 |
| Strain 9 | 1.1 |
| *Xanthomonas incanae* | 1.5 |
| *Xanthomonas phaseoli* | 1.1 |

In order to produce drinks of unusually good stability and clarity, it is desirable to treat the Xanthomonas hydrophilic colloid by the method disclosed in an application filed by John J. O'Connell on Apr. 28, 1964, Ser. No. 363,296 now Patent No. 3,355,447 for Treatment of Xanthomonas Hydrophilic Colloid and Resulting Product. In the method disclosed in this application, a 1½% by weight solution of a Xanthomonas hydrophilic colloid is heated to an elevated temperature of about 170° F. for a period of twenty minutes, cooled to 70° F. and filtered through a commercial filter using a filter aid sold under the name of Dicalite Speed Flow. The filtrate resulting therefrom was then reduced to a pH of 6.5 by the addition of hydrochloric acid and the Xanthomonas hydrophilic colloid product recovered therefrom by precipitation with isopropyl alcohol. The resulting precipitate was then dried. The material referred to in this specification and in the appended claims as a clarified or clarified type Xanthomons hydrophilic colloid is a Xanthomonas hydrophilic colloid such as that which results from treatment by the aforementioned O'Connell process.

The following are further examples of improved beverages illustrating my invention:

EXAMPLE 1

A sugar-free lemon-lime soft drink

| | Parts |
|---|---|
| Carbonated water | 98 |
| Lemon-lime oil flavoring | 0.1 |
| Citric acid | 0.1 |
| Sodium citrate | 0.05 |
| Calcium cyclamate | 0.20 |
| Clarified *Xanthomonas campestris* hydrophilic colloid | 0.05 |

This beverage has about ⅓ calorie per fluid ounce and good mouth-feel.

EXAMPLE 2

A carbonated cream-soda drink

For concentrate mix:

| | Percent |
|---|---|
| Citric acid | 0.5 |
| Sodium citrate | 0.3 |
| Vanilla | 5 |
| Ascorbic acid | 0.1 |
| Certified caramel coloring | 3 |
| Sugar | 60 |
| Benzoate of soda | 0.05 |
| Edible phosphoric acid | 1.0 |
| Clarified *Xanthomonas campestris* hydrophilic colloid | 0.25 |
| Water | Balance |

EXAMPLE 3

A dietetic carbonated cherry drink

| | Parts |
|---|---|
| Carbonated water | 97 |
| Artificial sweeteners: | |
| Sodium cyclamate | 0.27 |
| Saccharine | 0.005 |
| Citric acid | 0.10 |
| Sodium citrate | 0.05 |
| Ascorbic acid | 0.02 |
| Clarified *Xanthomonas campestris* hydrophilic colloid | 0.05 |
| Cherry flavoring to taste. | |
| Artificial coloring for color. | |

This beverage has only about ½ calorie per fluid ounce and yet has good body despite the absence of sugar.

The same formulation can be modified to give differently flavored drinks by altering the coloring appropriately and substituting for the cherry flavoring the following:

Root beer and herb flavoring for root beer,
Essential oils of orange, lemon and lime for orange,
Oil of sassafras and ascorbic acid for sarsaparilla,
Caffein, phosphoric acid and cola flavor for cola,
Ginger root extractive, essential oils, caramel color and ascorbic acid for ginger ale,
Vanilla and creme flavoring, phosphoric acid, caramel coloring and 0.05% benzoate of soda for creme soda, and
Quinine, oils of lemon and orange for quinine water.

EXAMPLE 4

An orange-flavored diet beverage

| | Parts |
|---|---|
| Water | 82 |
| Concentrated skim milk | 7.0 |
| Soya flour | 5.0 |
| Sucrose | 3.0 |
| Corn oil | 1.0 |
| Coconut oil | 1.0 |
| Cream | 0.5 |
| Calcium cyclamate | 0.1 |
| Sodium ascorbate | 0.02 |
| Yeast | 0.01 |
| Ascorbic acid | 0.02 |
| Xanthomonas campestris hydrophilic colloid | 0.10 |

Orange flavoring to taste.
Nutritional vitamins and minerals, trace amounts.

This diet food is a controlled source of substantially all necessary nutrients, providing a constant caloric intake (about 20 calories per fluid ounce—a few percent carbohydrates and low-sodium content). It may be modified for different flavors by deleting the orange flavoring and adding:

Strawberry flavoring (delete vanilla) for strawberry,
Cherry flavoring plus carmine red color for cherry,
Cocoa and malt syrup for chocolate malt.

EXAMPLE 5

Dietetic maple syrup

| | Parts |
|---|---|
| Water | 95 |
| Sorbitol | 1.0 |
| Calcium cyclamate | 0.70 |
| Saccharine | 0.10 |
| Xanthomonas campestris hydrophilic colloid | 0.3 |
| Benzoate of soda (preservative) | 0.05 |
| Citric acid | 0.20 |
| Caramel coloring | 0.20 |
| Salt | 1.0 |
| Imitation maple flavoring | (1) |

[1] Balance to taste.

The invention gives this syrup good mouth-feel, while lacking high calorie content of the heavy sugar syrups, having only about 1 calorie per ounce.

EXAMPLE 6

Dietetic artificial sweetener

| | Parts |
|---|---|
| Calcium cyclamate | 5 |
| Calcium saccharine soluble USP | 3 |
| Benzoic acid preservative | 0.1 |
| Methyl paraben | 0.05 |
| Xanthomonas campestris hydrophilic colloid | 1.0 |
| Propylene glycol USP | 5.0 |
| Water | 85 |
| Artificial flavoring | (1) |

[1] Balance to taste.

The invention helps to provide mouth-feel which artificial sweeteners characteristically lack, making them for many people an unpalatable substituted for sugar in foods. A Xanthomonas hydrophilic colloid according to the invention may also be added to the granulated form of such artificial sweeteners where it additionally offers the advantage of cold solubility.

EXAMPLE 7

Dietetic fruit juice

| | Parts |
|---|---|
| Water | 90 |
| Apple juice | 5.0 |
| Grape juice | 2.0 |
| Citric acid | 0.2 |
| Xanthomonas campestris hydrophilic colloid | 0.08 |
| Sodium cyclamate | 0.18 |
| Natural flavoring | (1) |

Artificial coloring to suit.
Vitamins as needed.

[1] Balance to taste.

In order to further evaluate the effectiveness of my method for preparing non-alcoholic beverages of improved mouth-feel, I prepared a beverage syrup as follows:

| | Percent |
|---|---|
| Calcium cyclamate | 1.46 |
| Sodium citrate | 0.365 |
| Citric acid | 1.27 |
| Additive | 1.1 |
| Water | 95.805 |

For preparation of the final drink for taste evaluation 13.7 gms. of the above syrup was diluted with 86.3 gms. of water to give a concentration of 0.15% of the additive. Samples of such a beverage were prepared using as the additive gum arabic, carboxymethyl cellulose, crystalline sorbitol, low methoxyl pectic, and a clarified Xanthomonas campestris hydrophilic colloid. The beverages so prepared with the different additives were then submitted to a taste panel of six members. The composition of the various samples was not known to the members of the panel. Each of the six members of the panel considered a beverage sample having the aforementioned Xanthomonas campestris hydrophilic colloid additive included therewith to have the best or most natural mouth-feel of the various additives tested.

It will be understood that carbonated beverages, such as those referred to above, are prepared as is customary; namely, by preparing a syrup from sugars or artificial sweeteners and water; adding acid and flavoring; blending this mixture; transferring a measured amount to a bottle or other container; filling the container with a purified, carbonated water; capping, labeling and shipping; the sweetened syrup or drink concentrate being sometimes shipped by itself, of course. The syrup is usually prepared by a manufacturer and shipped to various bottlers and carbonated water added to the container at the bottling plant or at the dispensing point, such as a soda fountain or vending machine.

In addition to the sweet syrup and carbonated water, such soft drinks often include one or more of the following: beverage acids, coloring, flavoring and preservative materials. For a dietetic liquid the level of fats and proteins will usually be insignificant and carbohydrates no more than a few percent (i.e., about 0.1% to about 9%). For low-sodium or salt-free foods, sodium will be held to from about 1–10 mg. per 100 grams of food material.

The sweetened beverage syrup or concentrate would customarily include sweeteners, as well as some of the above mentioned materials, dissolved in an aqueous solution. The sweetener in this syrup will comprise either an artificial sweetener, sugars, or mixtures thereof. If sugar is used, such syrups customarily include from 55% to 65% sugar by weight. Artificially sweetened drinks commonly have concentrations by wet weight of about: 0.02% to 0.40% sodium or calcium cyclamate and/or from about 0.001 to 0.20 of a saccharin, often higher for very sweet liquids.

Flavoring materials used in making beverages, and especially those of the carbonated type, generally take the form of alcoholic extracts, for the oily types of flavoring which cannot be carried in water alone, aqueous solutions for water-soluble ingredients and for the preparation of emulsions, and fruit concentrates. In the latter, a preservative, such as benzoate of soda, is often added. Essences of the natural or synthetic type are commonly used. Typical "beverage flavoring" ingredients used are: caffein for cola type drinks, ginger and citrus oils for ginger ale, artificial fruit flavoring with or without a fruit extract for imitation fruit drinks, vanilla, vanillin or bourbonal for cream-soda flavor, at least one from: oil of wintergreen, oil of sweet birch and methyl salicylate for root beer, the same for birch beer with methyl salicylate predominating, and the same also for sarsaparilla, including additionally oil of sassafras.

One of the commonly used beverage acids is a 50% citric acid solution, the citric acid adapting itself well to nearly all light or fruity flavors. Phosphoric acid is widely used in cola drinks and the heavier leaf, roof, nut or herbal flavors, while tartaric acid is used in grape flavors. In lesser amounts, citric, adipic, fumaric, succinic, malic, and lactic acids are also used, the malic acid for apple flavors.

Conventional "beverage coloring materials" are understood as being employed with the present invention, being especially adapted for beverages as regards stability and concentration and being of the edible type.

In the foregoing I have described various beverage compositions apt for use with the invention. While these beverages have proven especially apt for use in accordance with the invention, other beverages, especially the dietetic kind, may likewise utilize my invention with advantageous results; such as: fruit drinks, fruit juices, and vegetable juices. Beverages incorporating a Xanthomonas hydrophilic colloid in accordance with my invention include virtually all non-alcoholic beverages wherein it is desired to improve mouth-feel.

It will be understood that while there have been described herein certain specific embodiments of this invention, it is not intended that the invention be limited to or circumscribed by the specific details given in view of the fact that this invention is susceptible of various modifications and of changes in materials and in proportions in preparation and application, these changes being apparent to those skilled in the art as falling within the scope and spirit of this disclosure and of the claims appended hereto.

I claim:

1. An aqueous carbonated non-alcoholic diet-type beverage consisting essentially of beverage flavoring material, beverage coloring material, an edible acid selected from the group consisting of citric, phosphoric, tartaric, adipic, fumaric, succinic, malic, and lactic acids, artificial sweetener, water, and from about 0.01% to 0.25% by weight of a Xanthomonas hydrophilic colloid.

2. The product of claim 1 in which the said Xanthomonas hydrophilic colloid is a clarified *Xanthomonas campestris* hydrophilic colloid.

3. An aqueous carbonated non-alcoholic diet-type beverage consisting essentially of beverage flavoring material, beverage coloring material, an edible phosphoric acid, artificial sweetener, water, and from about 0.01% to 0.25% by weight of a Xanthomonas hydrophilic colloid.

4. An aqueous carbonated non-alcoholic diet-type beverage consisting essentially of beverage flavoring material, beverage coloring material, an edible citric acid, artificial sweetener, water, and from about 0.01% to 0.25% by weight of a Xanthomonas hydrophilic colloid.

5. An aqueous carbonated non-alcoholic diet-type beverage consisting essentially of beverage flavoring material, beverage coloring material, an edible citric acid, artificial sweetener, water, and from about 0.01% to 0.25% by weight of a clarified *Xanthomonas campestris* hydrophilic colloid.

References Cited

UNITED STATES PATENTS

| | | | |
|---|---|---|---|
| 3,093,488 | 6/1963 | Graham et al. | 99—206 |
| 3,054,689 | 9/1962 | Jeanes et al. | 195—31 |
| 3,023,106 | 2/1962 | Common | 99—78 |

OTHER REFERENCES

Manufacturing Chemist, New Polysaccharide Gums produced by Microbial Synthesis, May 1960.

A. LOUIS MONACELL, *Primary Examiner.*

S. DAVIS, *Assistant Examiner.*